United States Patent
Wilson

(10) Patent No.: US 7,840,773 B1
(45) Date of Patent: *Nov. 23, 2010

(54) PROVIDING MEMORY MANAGEMENT WITHIN A SYSTEM MANAGEMENT MODE

(75) Inventor: Mark Eric Wilson, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/403,628

(22) Filed: Mar. 13, 2009

Related U.S. Application Data

(63) Continuation of application No. 10/914,956, filed on Aug. 10, 2004, now Pat. No. 7,523,284.

(51) Int. Cl.
G06F 12/00 (2006.01)
G06F 13/00 (2006.01)
G06F 13/28 (2006.01)

(52) U.S. Cl. ............... 711/170; 711/171; 711/172; 711/173; 711/154; 711/156

(58) Field of Classification Search .......... 711/170
See application file for complete search history.

(56) References Cited

U.S. PATENT DOCUMENTS

| | | | |
|---|---|---|---|
| 5,414,826 A | 5/1995 | Garcia | |
| 5,432,908 A | 7/1995 | Heddes et al. | |
| 5,644,784 A | 7/1997 | Peek | |
| 5,724,551 A | 3/1998 | Greenstein et al. | |
| 5,742,797 A | 4/1998 | Celi et al. | |
| 6,453,403 B1 | 9/2002 | Czajkowski | |
| 6,457,112 B2 | 9/2002 | Hostetter | |
| 6,874,074 B1 | 3/2005 | Burton et al. | |
| 7,032,088 B2 | 4/2006 | Paladini et al. | |
| 7,035,988 B1 | 4/2006 | Marino | |
| 7,159,094 B1 | 1/2007 | Cholleti et al. | |
| 2002/0042787 A1 | 4/2002 | Sokol | |
| 2002/0144073 A1 | 10/2002 | Trainin et al. | |
| 2002/0169979 A1 | 11/2002 | Zimmer | |
| 2002/0176357 A1* | 11/2002 | Lay | 370/229 |
| 2003/0018689 A1 | 1/2003 | Ramakrishnan | |
| 2003/0028740 A1 | 2/2003 | Challenger et al. | |
| 2003/0058880 A1 | 3/2003 | Sarkinen et al. | |

(Continued)

OTHER PUBLICATIONS

Microsoft Computer Dictionary, Fifth Edition; 2002; definition of "table"; found at http://proquest.safaribooksonline.com/0735614954.*

(Continued)

*Primary Examiner*—Kevin L Ellis
*Assistant Examiner*—Prasith Thammavong
(74) *Attorney, Agent, or Firm*—Hope Baldauff Hartman, LLC

(57) ABSTRACT

Methods, systems, and computer-readable media are provided for managing memory within a system management mode ("SMM"). According to the method, a memory management program is executed within the SMM. The memory management program is operative to maintain a singly linked list having one or more descriptors for identifying allocated regions of system management random access memory ("SMRAM"). In particular, each descriptor identifies a region of SMRAM that has been allocated by the memory management program by storing an indication of the base memory address of the allocated region, an indication of the ending memory address for the allocated region, and a pointer to the next descriptor.

16 Claims, 15 Drawing Sheets

U.S. PATENT DOCUMENTS

2004/0168037 A1    8/2004    Dearth et al.
2005/0154851 A1    7/2005    Charles

OTHER PUBLICATIONS

Intel® Platform Innovation Framework for EFI System Management Mode Core Interface Specification (SMM CIS)—Draft for Review, Version 0.9, Sep. 16, 2003.

Nick Parlante, "Linked List Basics", Copyright 1998-2001, pp. 3-4.

U.S. Official Action dated Jul. 28, 2006 in U.S. Appl. No. 10/914,956.

U.S. Official Action dated Feb. 28, 2007 in U.S. Appl. No. 10/914,956.

U.S. Official Action dated Aug. 10, 2007 in U.S. Appl. No. 10/914,956.

U.S. Official Action dated Mar. 20, 2008 in U.S. Appl. No. 10/914,956.

U.S. Official Action dated Oct. 6, 2008 in U.S. Appl. No. 10/914,956.

U.S. Notice of Allowance / Allowability dated Dec. 10, 2008 in U.S. Appl. No. 10/914,956.

* cited by examiner

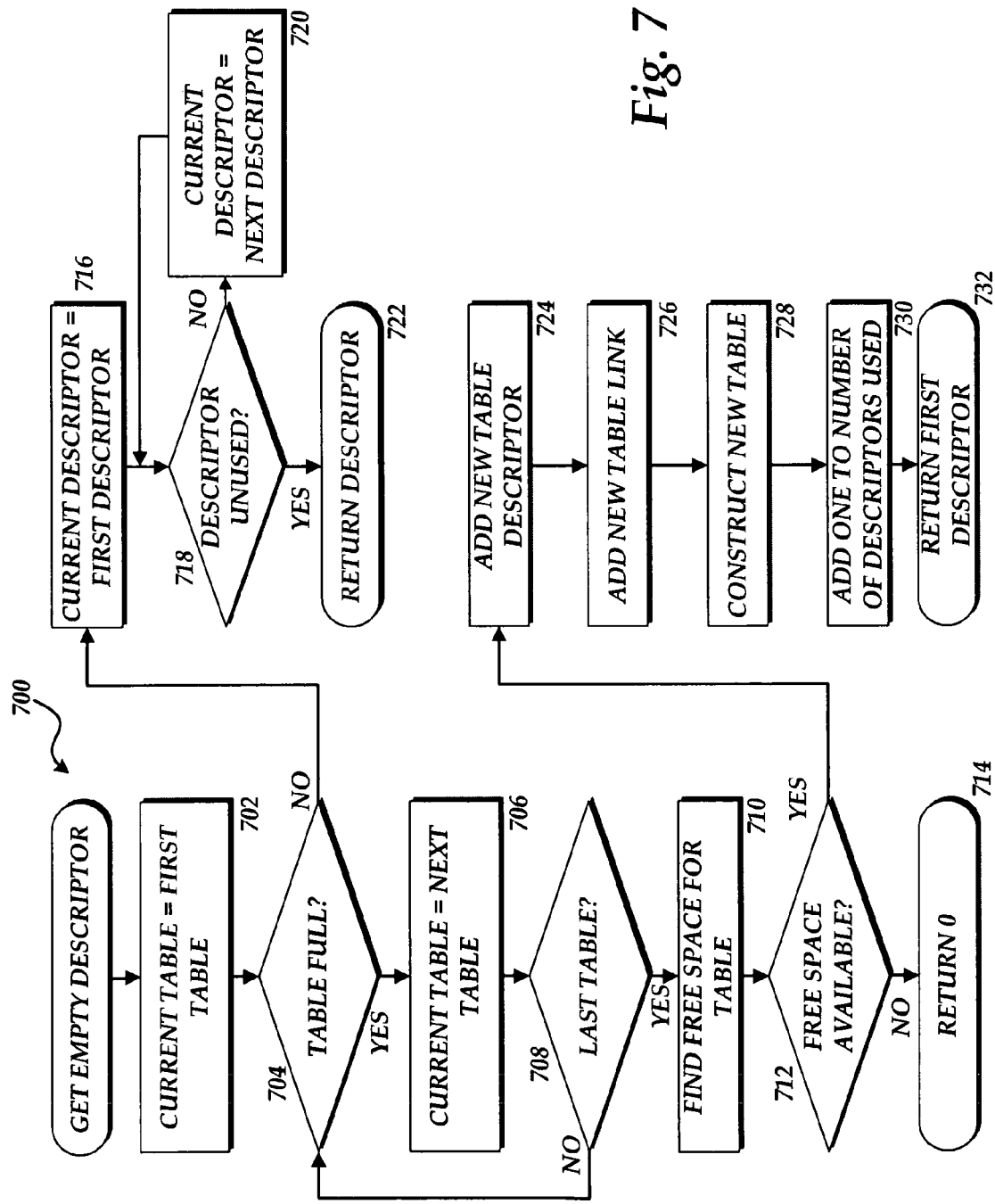

PROVIDING MEMORY MANAGEMENT WITHIN A SYSTEM MANAGEMENT MODE

RELATED APPLICATIONS

This application is a continuation of U.S. Pat. No. 7,523,284 issued Apr. 21, 2009, entitled "Method and Apparatus for Providing Memory Management within a System Management Mode", which is expressly incorporated herein in its entirety by reference.

BACKGROUND OF THE INVENTION

In most computing systems, low level instruction code is used as an intermediary between the hardware components of the computing system and the operating software and other high level software executing on the computing system. In some computer systems, this low level instruction code is known as the computer Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement, and the interface that the operating system may use in booting. How the firmware implements the interface is left up to the manufacturer of the firmware. The EFI specification provides protocols for EFI drivers to communicate with each other, and the core provider functions such as allocation of memory, creating events, setting the clock, and many others. This is accomplished through a formal and complete abstract specification of the software-visible interface presented to the operating system by the platform and the firmware.

Both BIOS and EFI utilize the system management mode ("SMM") provided in microprocessors available from INTEL CORPORATION and AMD CORPORATION. SMM is a special-purpose operating mode for handling system-wide functions like power management, system hardware control, or proprietary OEM-designed code. It is intended only for use by system firmware, not by applications software or general-purpose system software. The main benefit of SMM is that it offers a distinct and easily isolated processor environment that operates transparently to the operating system or executive and software applications.

When SMM is invoked through a system management interrupt ("SMI"), the central processing unit saves the current state of the processor (the processor's context), then switches to a separate operating environment contained in a special portion of random access memory ("RAM") called the system management RAM ("SMRAM"). While in SMM, the microprocessor executes SMI handler code to perform operations such as powering down unused disk drives or monitors, executing proprietary code, or placing the entire computer in a suspended state. When the SMI handler has completed its operations, it executes a resume ("RSM") instruction. This instruction causes the microprocessor to reload the saved context of the processor, switch back to protected or real mode, and resume executing the interrupted application or operating-system program or task.

The EFI is capable of providing an execution mode within the SMM and of providing services to other applications executing within the SMM. In particular, the EFI specification requires that a memory manager service be provided for use by program code executing within the SMM. It is, however, difficult to implement a memory manager program in the SMM due to the memory restrictions and other limitations imposed by the SMM. It is with respect to these considerations and others that the present invention has been made.

SUMMARY OF THE INVENTION

In accordance with the present invention, the above and other problems are solved by the methods, systems, and computer-readable media for providing memory management services from within a system management mode described herein. The memory management services are provided within the SMM and in conjunction with the execution of an extensible firmware interface.

According to one embodiment of the invention, a method for providing memory management within a system management mode is provided. According to the method, a memory management program is executed within the SMM. The memory management program is operative to maintain a singly linked list having one or more descriptors for identifying allocated regions of SMRAM. In particular, each descriptor identifies a region of SMRAM that has been allocated by the memory management program by storing an indication of the base memory address of the allocated region, an indication of the ending memory address for the allocated region, and a pointer to the next descriptor.

According to other aspects of the method, the memory management program is operative to receive and respond to requests from other programs to allocate regions within the SMRAM for use by the other programs. In particular, the memory management program may receive a request for SMRAM from another program. The request may describe the size of the requested region and may alternatively specify a starting memory address for the requested region.

In response to the request to allocate SMRAM, the memory management program is operative to determine based on the contents of the singly linked list, whether the requested memory is available. If the requested memory is not available, the memory management program returns an indication to the requesting program that the memory is unavailable. If the requested memory is available, the memory management program allocates a descriptor for the requested memory. The memory management program also returns an indication to the requesting program that the requested memory was successfully allocated.

According to other aspects of the invention, the memory management program is also operative to receive and respond to requests to deallocate memory regions within SMRAM. When a request to deallocate, or "free," a region within SMRAM is received, the memory management program is operative to search the linked list for one or more descriptors corresponding to the memory region to be deallocated. If no descriptors are located that correspond to the memory region to be deallocated, the memory management program returns an error. If one or more descriptors are located corresponding to the memory to be deallocated, the memory management program removes the descriptors from the singly linked list and returns an indication that the memory has been deallocated.

According to other aspects of the invention, the memory management program is further operative to initially allocate a predetermined number of descriptors in a table. The table may include a linked field indicating the number of descriptors in the table. The memory management program may also determine whether all of the descriptors have been utilized. This may occur, for instance, when a request is made to allocate memory which would require the use of an unused descriptor.

If all of the descriptors in the table have been utilized, the memory management program is operative to create a new table having one or more descriptors. The memory management program may also create a descriptor for the new table in the first table. The descriptor defines the starting and ending addresses of the new table and includes a pointer to the new table. The descriptors contained in the new table may then be utilized by the memory management program when allocating regions of SMRAM.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 5-12B are flow diagrams illustrating a process for providing memory management within an SMM computing mode according to the various embodiments of the invention.

DETAILED DESCRIPTION OF THE INVENTION

Figure 1:
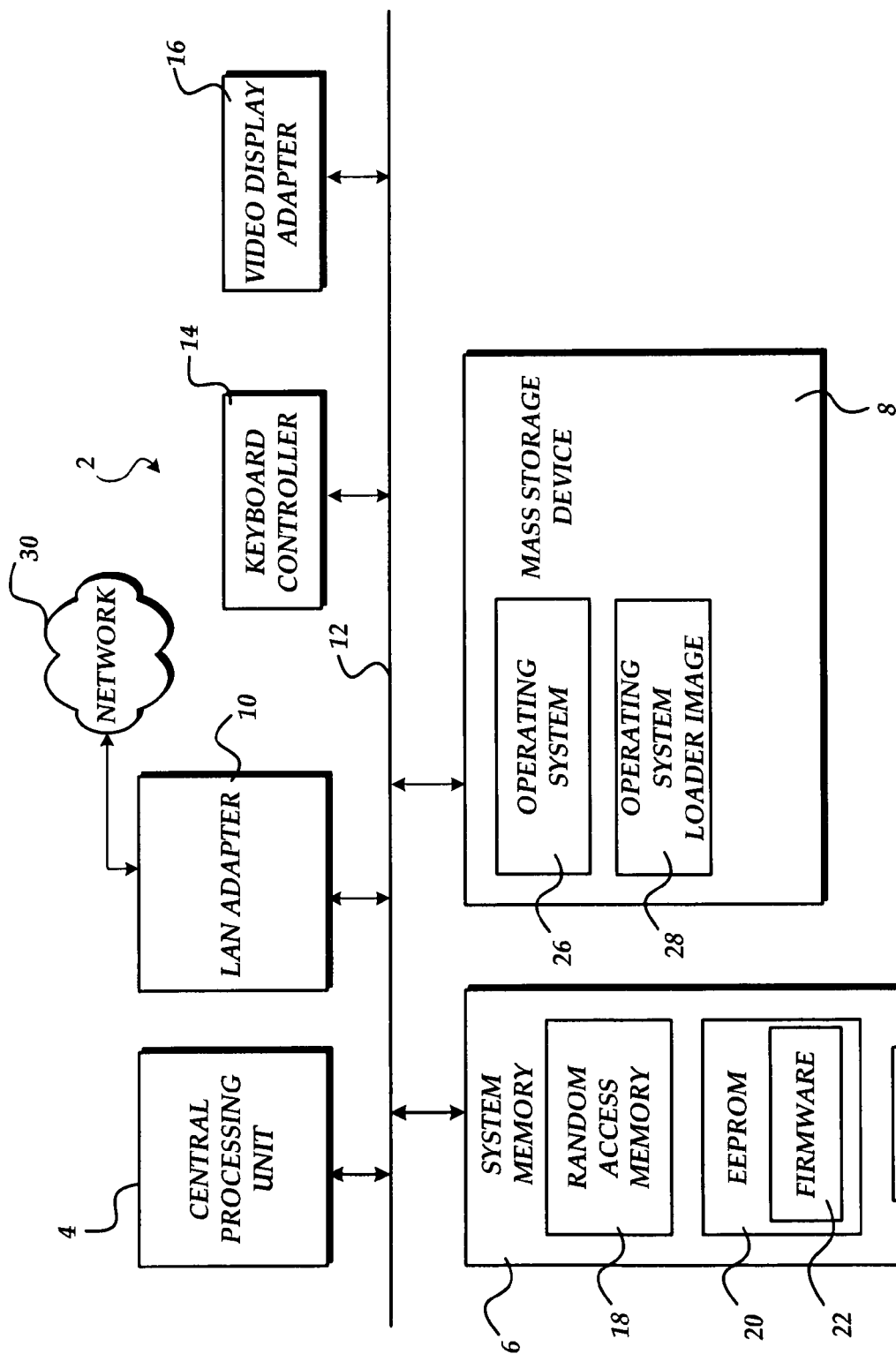
FIG. 1 is computer architecture diagram that illustrates the various components of a computer utilized in the embodiments of the invention.

Embodiments of the present invention provide methods, systems, apparatuses, and computer-readable media for memory management in an SMM computing mode. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 utilized in the various embodiments of the invention will be described. The computer architecture shown in FIG. 1 illustrates a conventional computer, including a CPU 4, a system memory 6, including a RAM 18, an EEPROM 20, a CMOS memory 24, and a system bus 12 that couples the memory to the CPU 4. The EEPROM 20 may store a firmware 22 for use in operating the computer 2, such as a BIOS or an extensible firmware interface ("EFI"), containing the basic routines that help to transfer information between elements within the computer, such as during startup. The CMOS memory 24 is a battery-backed memory device that is used by the firmware 22 to store setting information for the computer 2. Additional details regarding the architecture and operation of the firmware 22 will be provided below with respect to FIGS. 2 and 3.

The computer 2 further includes a mass storage device 8 for storing an operating system 26, an operating system loader image 28, application programs, and other program modules. The mass storage device 8 is connected to the CPU 4 through a mass storage controller (not shown) connected to the bus 12. The mass storage device 8 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a local area network ("LAN") adapter 10 connected to the bus 12. It should be appreciated that the LAN adapter 10 may also be utilized to connect to other types of networks and remote computer systems. The computer 2 may also include a keyboard controller 14 for receiving input from a keyboard and a video display adapter 16 for providing output to a display screen.

According to an embodiment of the invention, the CPU 4 may comprise a general purpose microprocessor from INTEL CORPORATION. For instance, the CPU 4 may comprise a PENTIUM 4 or XEON microprocessor from INTEL CORPORATION. As known to those skilled in the art, such microprocessors support a system management mode ("SMM"). The SMM provides an alternative operating environment that can be used to monitor and manage various system resources for more efficient energy usage, to control system hardware, and/or to run proprietary code. The SMM computing mode was introduced by the INTEL CORPORATION in the 386SL processor. The SMM computing mode is also available in the PENTIUM 4, XEON, P6 family, PENTIUM, and INTEL 386 processors. SMM is also available in compatible microprocessors from other manufacturers.

SMM is a special-purpose operating mode for handling system-wide functions like power management, system hardware control, or proprietary OEM-designed code. It is intended only for use by system firmware, not by applications software or general-purpose system software. The main benefit of SMM is that it offers a distinct and easily isolated processor environment that operates transparently to the operating system or executive and software applications.

When SMM is invoked through a system management interrupt ("SMI"), the CPU 4 saves the current state of the processor (the processor's context), then switches to a separate operating environment contained in a special portion of the RAM 18 called the system management RAM ("SMRAM"). While in SMM, the CPU 4 executes SMI handler code to perform operations such as powering down unused disk drives or monitors, executing proprietary code, or placing the entire computer 2 in a suspended state. When the SMI handler has completed its operations, it executes a resume ("RSM") instruction. This instruction causes the CPU 4 to reload the saved context of the processor, switch back to protected or real mode, and resume executing the interrupted application or operating-system program or task.

The execution of the SMM computing mode is transparent to applications and operating systems. This transparency is guaranteed because the only way to enter SMM is by means of an SMI, because the processor executes SMM code in a separate address space (SMRAM) that can be made inaccessible from the other operating modes, because the processor saves the context of the interrupted program upon entering SMM, because all interrupts normally handled by the operating system are disabled upon entry into SMM, and because the RSM instruction can only be executed in SMM. Additional details regarding the operation of the SMM computing mode are provided in documentation available from INTEL CORPORATION and are well known to those skilled in the art.

As discussed above, while in SMM the CPU 4 executes code and stores data in the SMRAM address space. The SMRAM is mapped to the physical address space of the processor and can be up to 4 GB in size. The CPU 4 uses this space to save the context of the processor and to store the SMI handler code, data, and stack. The SMRAM can also be used to store system management information and OEM-specific information. The default SMRAM size is determined by the chip set utilized. The SMRAM is located at a base physical address in physical memory called the SMBASE.

The SMBASE is typically set to the beginning of SMRAM. When a SMI occurs, the CPU switches to SM mode, saving the CPU context to addresses relative to the SMBASE and begins execution at SMBASE+8000h. As will be described in greater detail below, processes executing in conjunction with an EFI within the SMM computing mode require memory management functionality. The various embodiments of the invention provide memory management for processes executing in conjunction with EFI within the SMM computing mode.

Figure 2:
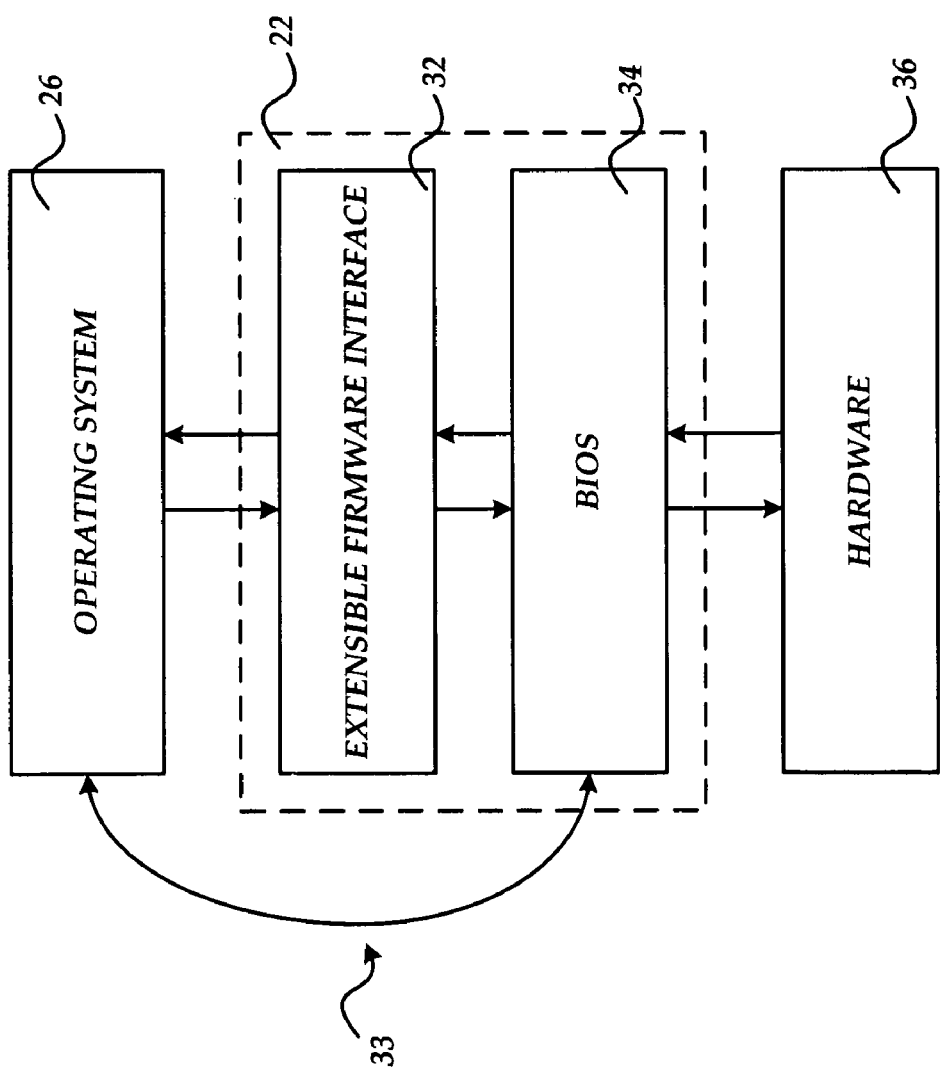
FIGS. 2 and 3 are computer architecture diagrams that illustrate aspects of an extensible firmware interface utilized by the embodiments of the invention.

Referring now to FIG. 2, additional details regarding the operation of the firmware 22 of the computer 2 will be described. According to embodiments of the invention, the firmware 22 may comprise a computer basic input output system ("BIOS"). As known to those skilled in the art, the BIOS of a PC-compatible computer provides an interface between the operating system 26 and the hardware 36 of the computer 2. Alternatively, the firmware 22 may comprise a firmware compatible with the EFI specification from INTEL CORPORATION.

The EFI specification describes an interface between the operating system 26 and the system firmware 22. The EFI specification defines the interface that platform firmware must implement, and the interface that the operating system 26 may use in booting. How the firmware 22 implements the interface is left up to the manufacturer of the firmware. The intent of the specification is to define a way for the operating system 26 and firmware 22 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 32 and a BIOS 34 may be presented in the firmware 22. This allows users and system integrators to support both firmware interfaces. In order to provide this functionality, an interface 33 may be provided for use by legacy operating systems and applications. Additional details regarding the architecture and operation of the EFI 32 are provided below with respect to FIG. 3. Moreover, additional details regarding the operation and architecture of EFI can be found in the EFI specification which is available from INTEL CORPORATION and expressly incorporated herein by reference.

Figure 3:
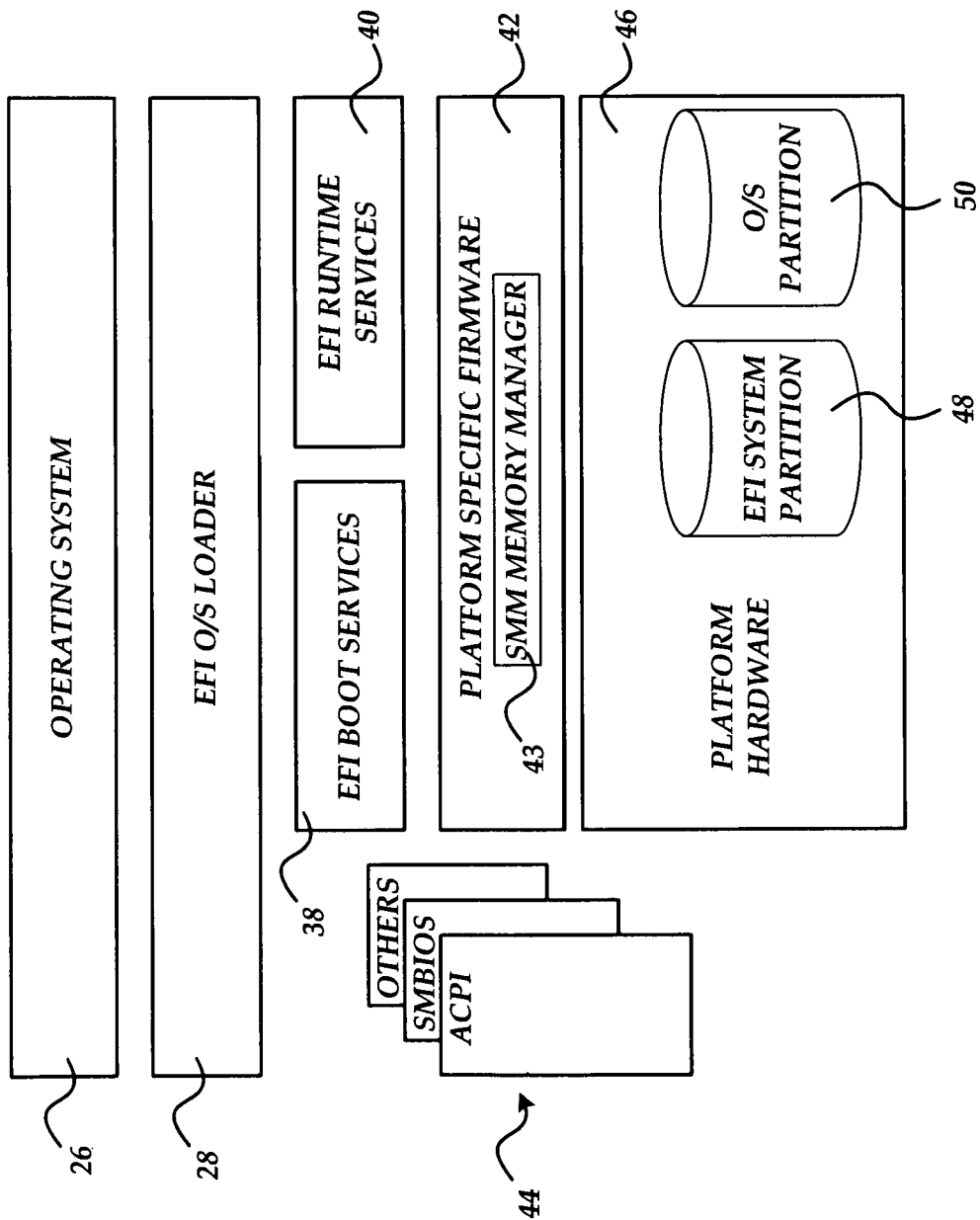

Turning now to FIG. 3, additional details regarding an EFI specification-compliant system utilized to provide an operating environment for the various embodiments of the invention will be described. As shown in FIG. 3, the system includes platform hardware 46 and an operating system 26. The platform firmware 42 may retrieve an OS image from the EFI system partition 48 using an EFI O/S loader 28. The EFI system partition 48 may be an architecturally shareable system partition. As such, the EFI system partition 48 defines a partition and file system that are designed to allow safe sharing of mass storage between multiple vendors. An O/S partition 50 may also be utilized.

Once started, the EFI O/S loader 28 continues to boot the complete operating system 26. In doing so, the EFI O/S loader 28 may use EFI boot services 38 and interface to other supported specifications to survey, comprehend, and initialize the various platform components and the operating system software that manages them. Thus, interfaces 44 from other specifications may also be present on the system. For example, the Advanced Configuration and Power Management Interface ("ACPI") and the System Management BIOS ("SMBIOS") specifications may be supported.

EFI boot services 38 provides interfaces for devices and system functionality that can be used during boot time. EFI runtime services 40 may also be available to the O/S loader 28 during the boot phase. For example, a minimal set of runtime services may be presented to ensure appropriate abstraction of base platform hardware resources that may be needed by the operating system 26 during its normal operation. EFI allows extension of platform firmware by loading EFI driver and EFI application images which, when loaded, have access to all EFI-defined runtime and boot services.

In order to provide memory management services to processes executing in conjunction with EFI within the SMM computing mode, the platform specific firmware may provide an SMM memory manager application program 43 (also referred to herein as "SMM memory manager" and the "SMM memory manager application program") that executes within SMM. The SMM memory manager application 43 may be called to allocate and deallocate pages of memory within the SMRAM. Additional details regarding the use of SMM within EFI can be found in the INTEL CORPORATION Platform Innovation Framework for EFI System Management Mode Core Interface Specification ("SMM CIS") which is available from INTEL CORPORATION and expressly incorporated herein by reference. Additional details regarding the operation of the SMM memory manager application program 43 will be provided below with respect to FIGS. 4-12B.

Figure 4:
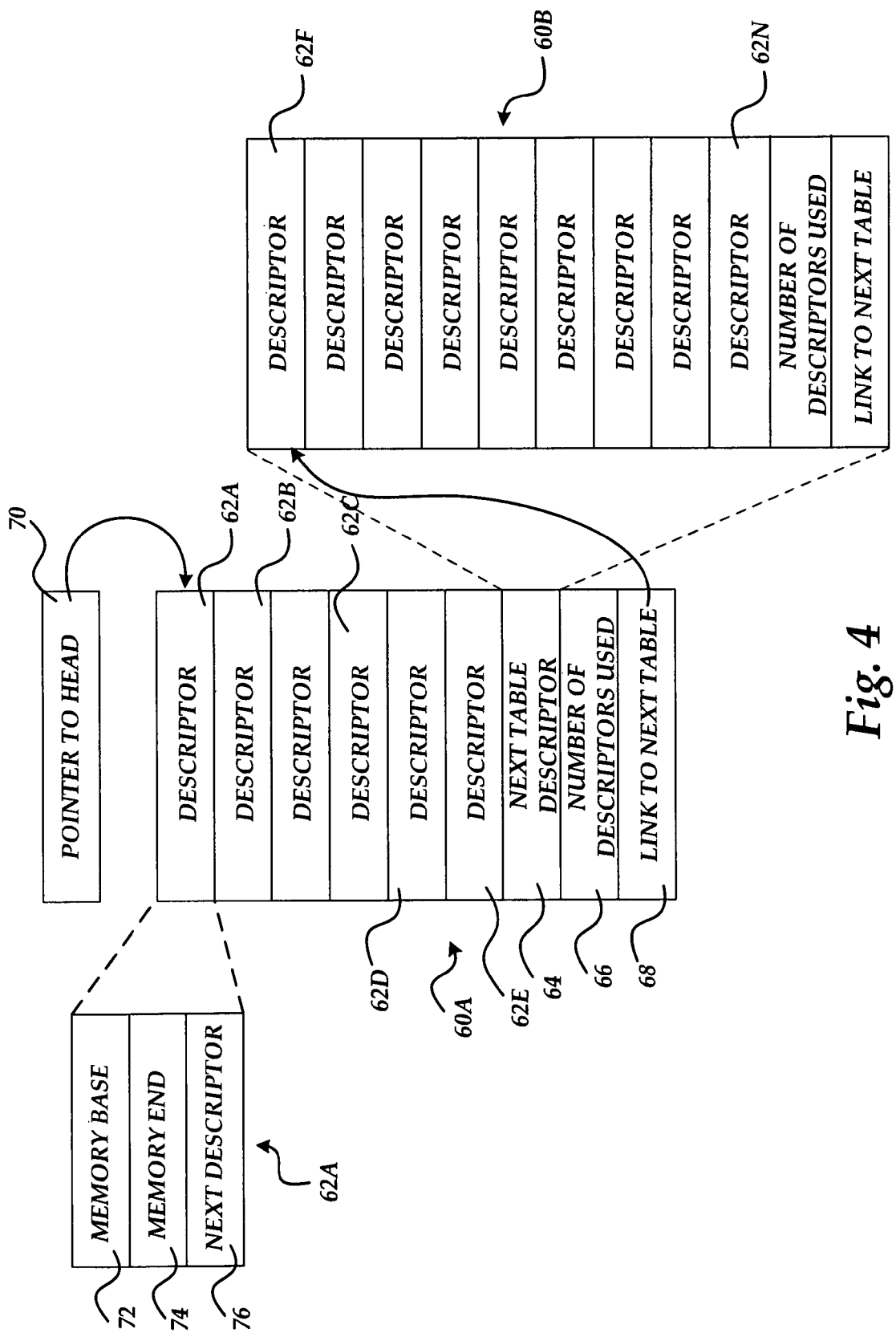
FIG. 4 is a data structure diagram illustrating aspects of a linked list utilized to provide memory management services in one embodiment of the invention.

Turning now to FIG. 4, a data structure utilized by the SMM memory manager application 43 to keep track of allocated memory within the SMRAM will be described. As shown in FIG. 4, the SMM memory manager 43 utilizes a memory reserved table 60A to keep track of memory that has been allocated. The memory reserved table 60A comprises a singly linked list of descriptors 62A-62N that each describe an allocated portion of the SMRAM. As shown in FIG. 4, each descriptor 62A-62E includes a field 72 indicating the base memory address of the allocated region. Each descriptor 62A-62E also includes a field 74 indicating the ending memory address of the allocated region. Each descriptor 62A-62E also comprises a field 76 that includes a pointer to the next descriptor in the memory reserved table 60A. In this manner, each of the descriptors 62A-62E in the memory reserved table 60A together identify all of the memory regions that have been allocated in the SMRAM by the SMM memory manager 43.

When the SMM memory manager application 43 is initialized, it creates a first memory reserved table 60A containing a predetermined number of unused descriptors. For instance, 50 descriptors may be allocated initially by the SMM memory manager application 43. A pointer 70 is created to the head of the linked list that comprises the memory reserved table 60A. Each of the allocated descriptors are initially marked as unused by placing a predetermined number in the fields 72 and 74 ("FFFFh", for instance). A predetermined value is also placed in the field 76 to indicate that a descriptor is the last descriptor in the list. A field 66 is also allocated in the memory reserved table 60A that indicates the number of descriptors currently in use.

As will be described in greater detail below, descriptors 62A-62E are utilized to represent regions of allocated SMRAM. The descriptors are allocated by the SMM memory manager application 43 as requests to allocate regions of memory are received. The descriptors are also deallocated as requests to free SMRAM are received by the SMM memory manager application 43. As these operations take place, the field 66 is updated to continually reflect the current number of descriptors that have been utilized.

If the SMM memory manager application 43 determines that all of the descriptors in the table 60A have been utilized, the SMM memory manager application 43 is operative to create a new table 60B including a predetermined number of descriptors 62F-62N. A descriptor is also created in the table 60A for the new table 60B. Additionally, a link 68 to the new table 60B is created that points to the head of the new table 60B. In this manner, additional descriptors may be added when needed. It should be appreciated that any number of tables including any number of descriptors may be added in a similar fashion up to the limit of available memory. Additional details regarding the operation of the memory manager application 43 and its use of the memory allocated table 60A are provided below with reference to FIGS. 5-12B.

Figure 5:
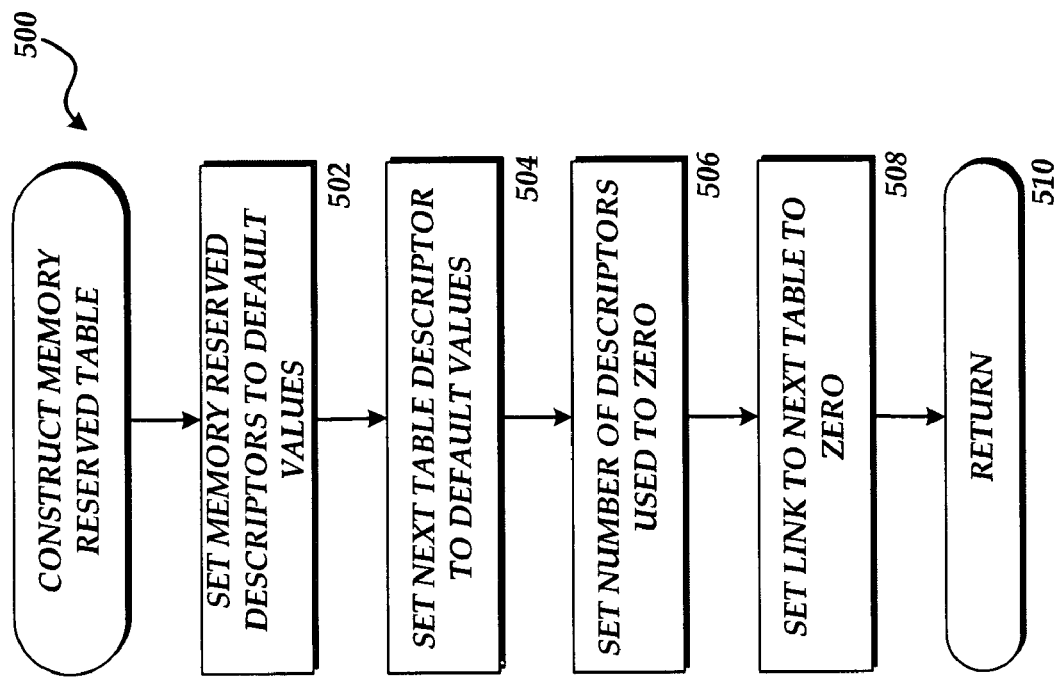

Referring now to FIG. 5, an illustrative routine 500 will be described for constructing the memory reserved table 60A. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 5, additional details regarding an illustrative process 500 for constructing the memory reserved table 60A will be described. It should be appreciated that the process illustrated in FIG. 5 is executed by the SMM memory manager application 43 upon initialization to create a new memory reserved table 60A. It should also be appreciated that the same routine 500 may be executed by the SMM memory manager application 43 in order to create a new memory reserved table 60B.

The routine 500 begins at operation 502, where the SMM memory manager application 43 creates the memory reserved table 60A illustrated in FIG. 4. In particular, the SMM memory manager application 43 creates within the SMRAM one or more descriptors 62A-62E. The descriptors 62A-62E are set to default values indicating that they have not yet been utilized to identify an allocated region within the SMRAM. Once the descriptors 62A-62E have been allocated, the routine 500 continues from operation 502 to operation 504.

At operation 504, the SMM memory manager application 43 creates a field 64 which comprises a descriptor for a next table 60B. Initially, because no next table is present, the next table descriptor 64 is indicated as being unused. From operation 504, the routine 500 continues to operation 506. At operation 506, the SMM memory manager application 43 creates a field 66 that identifies the current number of descriptors that have been allocated. Initially, because no descriptors have been used, this number is set to zero.

From operation 506, the routine 500 continues to operation 508, where the field 68 is created comprising a link to another table. Because no additional table is present when the table 60A is initially created, the field 68 initially contains a zero indicating that no other table is present. From operation 508, the routine 500 continues to operation 510, where it ends.

It should be appreciated that, if the routine 500 is utilized to create a second or subsequent memory reserved table 60B, that the field 64 would include information describing the base address, end address, and next descriptor contained in the table 60B. It should also be appreciated that the field 68 would contain a link to the head of the newly created table 60B. In this manner, any number of memory allocated tables 60A and 60B may be chained to create a virtually unlimited number of descriptors.

Figure 6A:
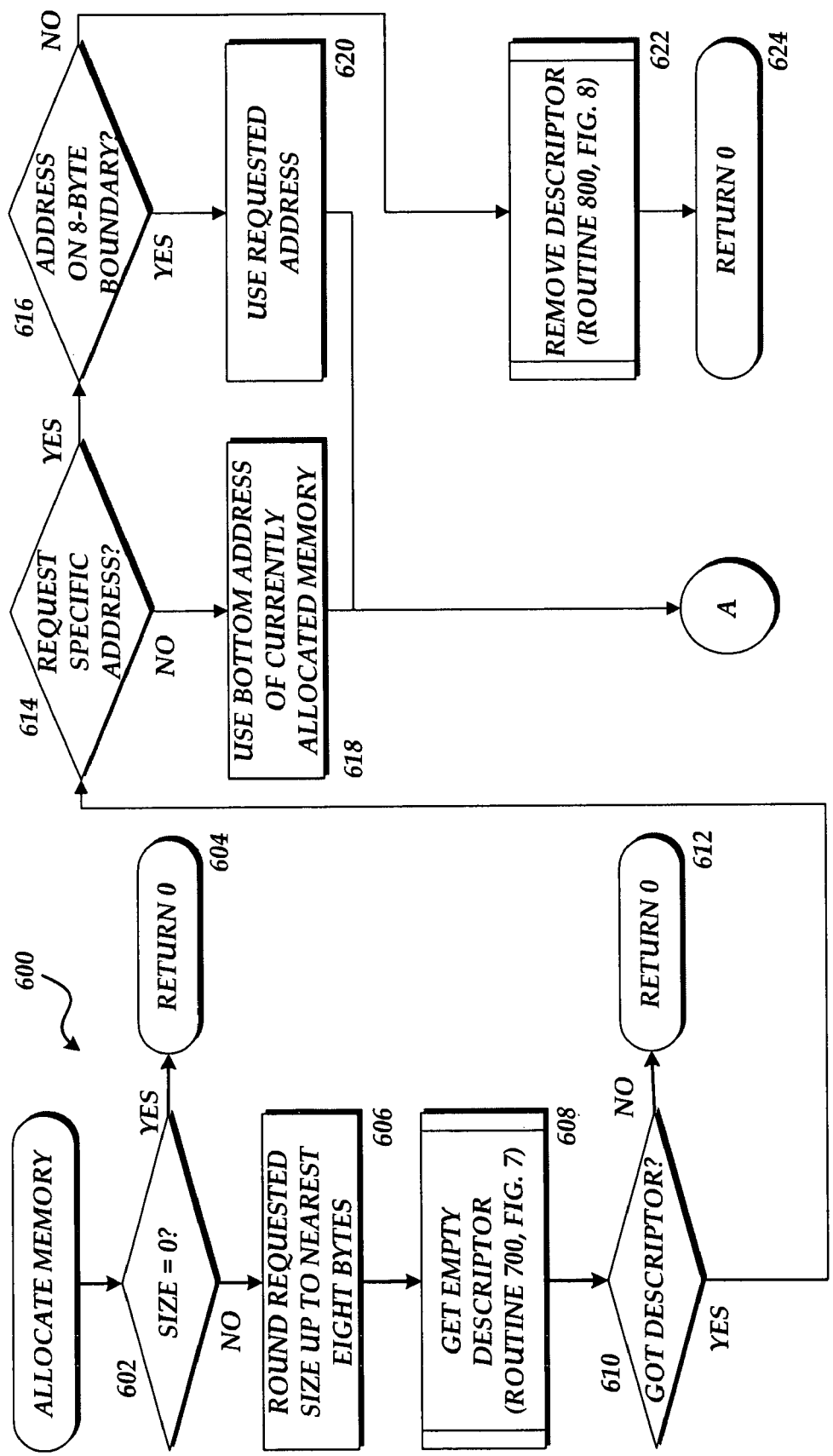
Figure 6B:
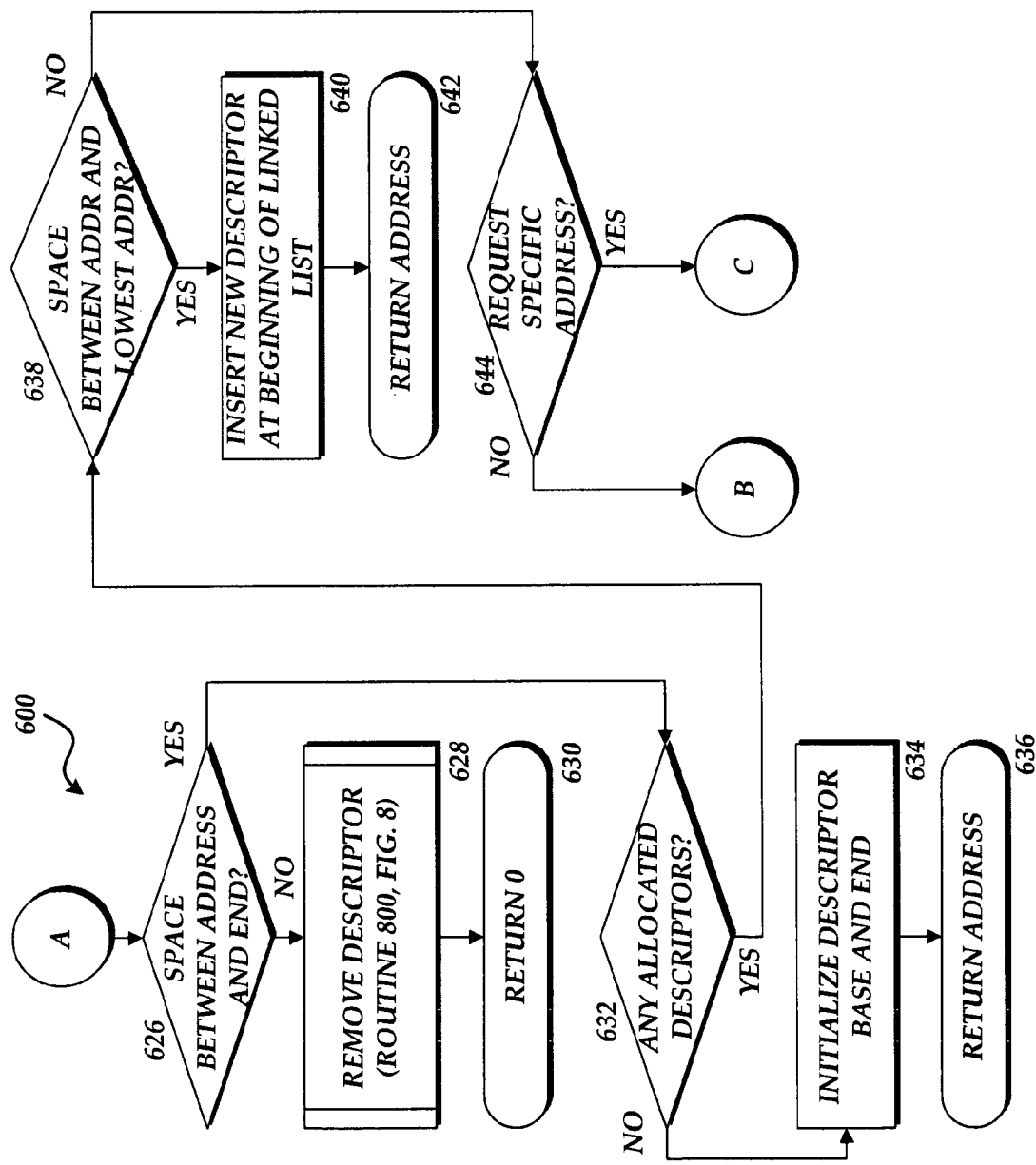
Figure 6C:
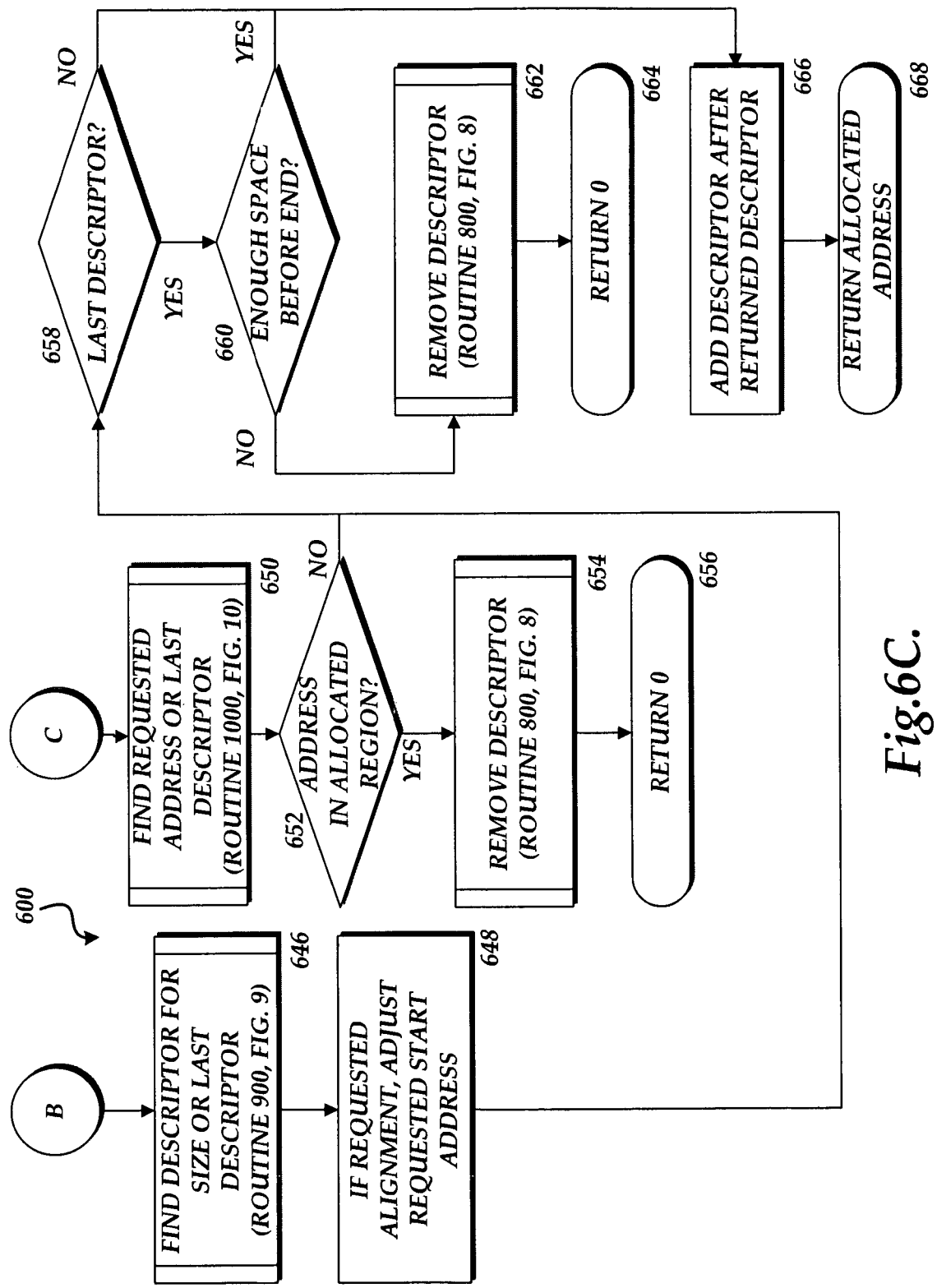

Turning now to FIGS. 6A-6C, an illustrative routine 600 will be described for allocating memory in response to requests directed to the SMM memory manager application 43. According to embodiments of the invention, the routine 600 is performed by the SMM memory manager application 43 in response to a request to allocate a portion of the SMRAM. In one embodiment, the routine 600 may take as a parameter the size of the requested memory area to be allocated. Alternatively, the requesting program may specify a particular memory address at which the memory should be allocated. Alternatively, the calling program may also specify an alignment for the requested memory location. If the address and alignment are not specified, these parameters are not utilized. For example, if a zero is passed for the address or alignment, then these parameters are not utilized.

The routine 600 begins at operation 602, where the SMM memory manager application 43 determines whether the requested size of the memory to be allocated is equal to zero. If the requested size is equal to zero, no further processing is necessary and the routine 600 branches to operation 604 where an error is returned. If, however, the size is greater than zero, the routine 600 continues to operation 606.

At operation 606, the requested size is rounded up to the nearest 8 bytes. In this manner, the requested size is aligned on 8 byte boundaries. From operation 606, the routine 600 continues to operation 608, where the SMM memory manager application 43 obtains an empty descriptor within the memory reserved table 60A. An illustrative routine 700 will be described below with reference to FIG. 7 for obtaining an empty descriptor.

From operation 608, the routine 600 continues to operation 610, where a determination is made as to whether a descriptor has been obtained. If an empty descriptor could not be obtained, the routine 600 branches to operation 612, where an error message is returned by the SMM memory manager application 43 to the requesting program. If a descriptor was obtained, the routine 600 continues from operation 610 to operation 614.

At operation 614, a determination is made as to whether a particular address was specified with the request to allocate new memory. If no request for a specific address was made with the request, the routine 600 continues from operation 614 to operation 618, where the bottom address of the currently allocated memory is utilized as a starting point for determining whether the requested amount of memory may be allocated. Alternatively, if at operation 614 it is determined that a specific address was requested, the routine 600 branches from operation 614 to operation 616.

At operation 616, a determination is made as to whether the requested address is located on an 8 byte boundary. If the address is located on an 8 byte boundary, the routine 600 continues to operation 620, where the requested address is utilized as a starting point for determining whether the requested amount of memory may be allocated. If the requested address is not located on an 8 byte boundary, the routine 600 branches to operation 622, where the allocated descriptor is removed. An illustrative routine 800 will be described below with reference to FIG. 8 for removing an allocated descriptor. From operation 622, the routine 600 continues to operation 624, where it returns an error. It should be appreciated that the operations described herein for determining whether the requested address and requested size are located on a particular byte boundary may be utilized to ensure that the requested address and size are located on a boundary of any size. Although as described herein an 8 byte boundary is utilized, it should be appreciated that any type of boundary desired may be utilized.

From operations 618 and 620, the routine 600 continues to operation 626, where a determination is made as to whether enough memory exists between the starting address, either the highest currently allocated memory address or the designated memory address, and the end of the system random access memory. If it is determined at operation 626 that enough space is not available to satisfy the requested allocation the routine 600 continues to operation 628 where the obtained descriptor is marked as unused and thereby removed. Additionally, if the memory requested is larger than any available block of SMRAM, then an error is returned. An illustrative routine 800 will be described below with reference to FIG. 8 for removing a previously allocated descriptor. From operation 628, the routine 600 continues to operation 630 where it ends.

If, at operation 626, it is determined that enough space exists to satisfy the requested allocation, the routine 600 branches from operation 626 to operation 632. At operation 632, a determination is made as to whether any descriptors have been previously allocated. If no descriptors have been previously allocated, thereby indicating that no memory has been allocated, the routine 600 branches to operation 634 where the descriptor base and end are initialized for the requested memory allocation. The routine then continues to operation 636, where the address of the allocated memory is returned to the requesting program.

If, at operation 632, it is determined that descriptors have been previously allocated, the routine 600 branches to operation 638. At operation 638, a determination is made as to whether enough memory space is located between the beginning of the SMRAM and the lowest allocated address. If enough space is available to satisfy the request, the routine 600 continues to operation 640 where a new descriptor link of the allocated address is inserted at the beginning of the linked list. The routine 600 then continues to operation 642 where the allocated memory address is returned to the calling program.

If, at operation 638, it is determined that not enough memory exists between the beginning of the SMRAM and the lowest allocated address, the routine 600 branches to operation 644. At operation 644, a determination is made as to whether the calling program requested a specific starting address for the memory to be allocated. If a specific starting address was requested, the routine 644 continues to operation 650. If a specific address was not requested, the routine 600 branches from operation 644 to operation 646.

At operation 646, descriptors of allocated memory are searched for a gap of unallocated memory large enough to allocate the requested memory. The descriptor of allocated memory preceding the gap is located. If no gaps of unallocated memory large enough are found, the last already allocated descriptor is located. An illustrative routine 900 will be described below with reference to FIG. 9 for allocating a descriptor corresponding to a sufficiently large amount of memory to satisfy the requested memory allocation. From operation 646, the routine 600 continues to operation 648 where the starting address of the free block is rounded up to the aligned address if alignment was requested with the initial memory request. The routine 600 then continues from operation 648 to operation 658.

At operation 650, the memory reserved table 60A is searched to identify whether the allocated descriptors includes the requested memory address. If an allocated descriptor does not include the requested memory address, the last descriptor is identified as the descriptor for the requested memory region. From operation 650, the routine 600 continues to operation 652 where a determination is made as whether the requested memory address is located within a region that has been previously allocated. If the address is located within a region that has been previously allocated, the routine 600 continues to operation 654 where the allocated descriptor is removed. The descriptor that is removed is the descriptor that was just allocated by this routine. An illustrative routine 800 will be described below with reference to FIG. 8 for removing a previously allocated descriptor. From operation 654, the routine 600 continues to operation 656 where it returns an error to the calling program.

If, at operation 652, it is determined that the requested address is not within a previously allocated memory region, the routine 600 branches from operation 652 to operation 658. At operation 658, a determination is made as to whether the descriptor identified to satisfy the requested memory allocation is the last descriptor in the memory reserved table 60A. If the allocated descriptor is the last descriptor, the routine 600 continues to operation 660, where a determination is made as to whether enough memory space exists between the highest previously allocated memory address and the end of the system management random access memory. If enough space does not exist, the routine 600 branches from operation 660 to operation 662 where the descriptor is removed as described below with reference to FIG. 8. The descriptor that is removed is the descriptor that was just allocated by this routine. The routine 600 then continues to operation 664, where it returns an error message to the program that made the memory allocation request.

If, at operation 658, it is determined that the descriptor located in blocks 646 and 650, is not the last descriptor in the linked list, or if enough unallocated space exists between the last descriptor and the top of system management random access memory, the routine 600 branches to operation 666. At operation 666, the newly allocated descriptor is linked to the descriptor located at either operation 646 or 650 and no longer marked unused. The routine 600 then continues to operation 668 where the allocated memory address is returned to the calling program.

Turning now to FIG. 7, an illustrative routine 700 will be described for returning the first unused descriptor in the memory reserved table 60A. It should be appreciated that used descriptors within the memory reserve 60A are sorted in the linked list according to the order of the allocated memory address. After unused descriptors are located, the unused descriptor can be linked into the list to add a new entry. It should also be appreciated that unused descriptors may be anywhere in the linked list as a result of the deallocation of memory.

The routine 700 begins at operation 702, where a variable corresponding to the current table being analyzed is set to the first table. This variable is utilized to traverse any number of memory reserved tables that may be utilized at any given time. From operation 702, the routine 700 continues to operation 704 where a determination is made as to whether the descriptors in the current table have all been utilized. In order to make this determination, the number of descriptors used field 66 may be consulted.

If, at operation 704, it is determined that the current table has no unused descriptors, the routine 700 continues to operation 706. At operation 706, the current table is set to the next table if any exists. The routine 700 then continues to operation 708, where a determination is made as to whether no other tables exist to be analyzed. If other tables exist, the routine 700 returns to operation 704. If, however, it is determined that no other tables exist, the routine 700 continues to operation 710. At operation 710, an attempt is made to locate free space for an additional memory reserved table within the system management random access memory. At operation 712, a determination is made as to whether free space has been located for the new memory reserved table. If no free space is available, this indicates that the current memory reserved tables have no unused descriptors and no additional memory exists to add a new memory reserved table. Accordingly, under these conditions, the routine 700 continues to operation 714, where an error message is returned to the calling program.

If, at operation 712, it is determined that free space is available, the routine 700 branches to operation 724 where a new table descriptor 64 is added. The routine 700 then continues to operation 726, where a link 68 to the new table is created. A new table may be created in the manner described above with reference to FIG. 5. At operation 728, descriptors for the new table are allocated in the new table as constructed. At operation 730, the field 66 is incremented to increase the number of descriptors used by one. The routine 700 then continues to operation 732, where the first descriptor in the new memory reserved table is returned as the empty descriptor for the new memory region to be allocated.

If, at operation 704, it is determined that the current memory reserved table has unused descriptors, the routine 700 branches from operation 704 to operation 716. At operation 716, a variable corresponding to the current descriptor is set to the first descriptor within the memory reserved table. The routine 700 then continues to operation 718, where a determination is made as to whether the current descriptor is unused. If the current descriptor is not unused, the routine 700 branches to operation 720 where the current descriptor is set to the next descriptor within the current memory reserved table. The routine then returns to operation 718. In this manner, the first unused descriptor within the current memory reserved table may be identified. When the descriptor is identified, the routine 700 continues from operation 718 to operation 722 where the identified descriptor is returned.

Figure 8:
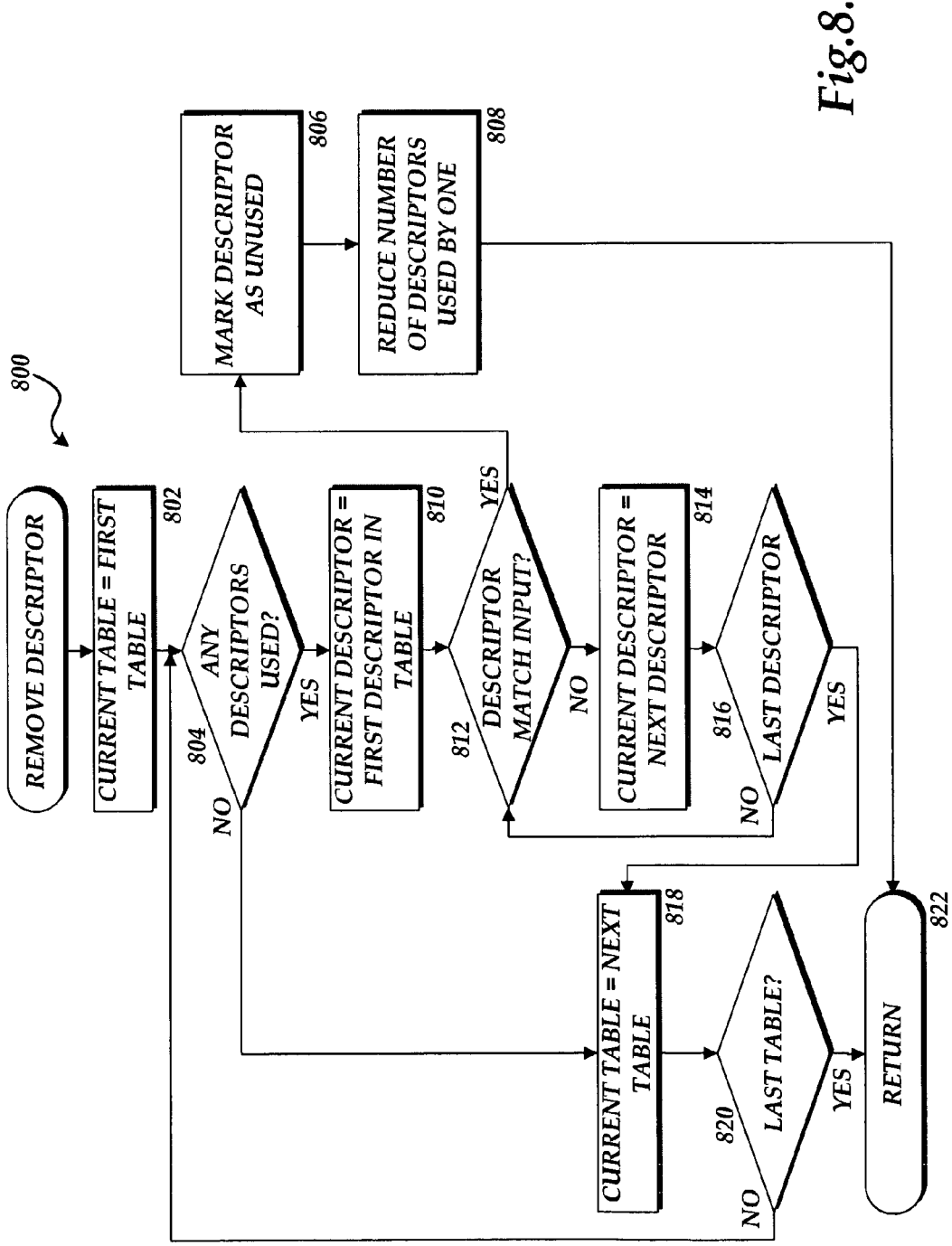

Referring now to FIG. 8, an illustrative routine 800 will be described for removing a descriptor from the memory reserved table 60A in order to free memory. The routine 800 begins at operation 802, where a variable identifying the current memory reserved table is set to the first table. The routine then continues to operation 804, where a determination is made as to whether any descriptors have been utilized within the current memory reserved table. If no descriptors have been utilized, the routine 800 branches to operation 818, where the variable corresponding to the current memory reserved table is set to the next table. The routine 800 then continues to operation 820 where a determination is made as to whether the last memory reserved table has been encountered. If the last table has not been encountered, the routine 800 branches back to operation 804. If the last table has been encountered, the routine 800 continues from operation 820 to operation 822 where it returns.

If, at operation 804, it is determined that descriptors have been utilized within the current memory reserved table, the routine 800 continues to operation 810. At operation 810, the variable corresponding to the current descriptor is set to the first descriptor in the current table. The routine 800 then continues to operation 812, where a determination is made as to whether the current descriptor matches an input provided with the request to remove a descriptor identifying the descriptor that should be removed. The parameter provided with the call to the routine to remove the descriptor may comprise the beginning memory address of the allocated memory region. If the current descriptor does not match the input parameter, the routine 800 continues to operation 814, where the variable corresponding to the current descriptor is set to the next descriptor in the current memory reserved table. The routine 800 then continues to operation 816, where a determination is made as to whether the last descriptor in the current memory reserved table has been encountered. If the last descriptor has not been encountered, the routine 800 branches back to operation 812. If the last descriptor has been encountered, the routine 800 continues to operation 818 where the next memory reserved table is processed.

If, at operation 812, it is determined that the current descriptor matches the input parameter provided with the request to remove the descriptor, the routine 800 branches to operation 806. At operation 806, the current descriptor is marked as unused. The routine then continues to operation 808, where the number of descriptors used field 66 is reduced by one to account for the removed descriptor. The routine 800 then continues from operation 808 to operation 822, where it returns.

Figure 9:
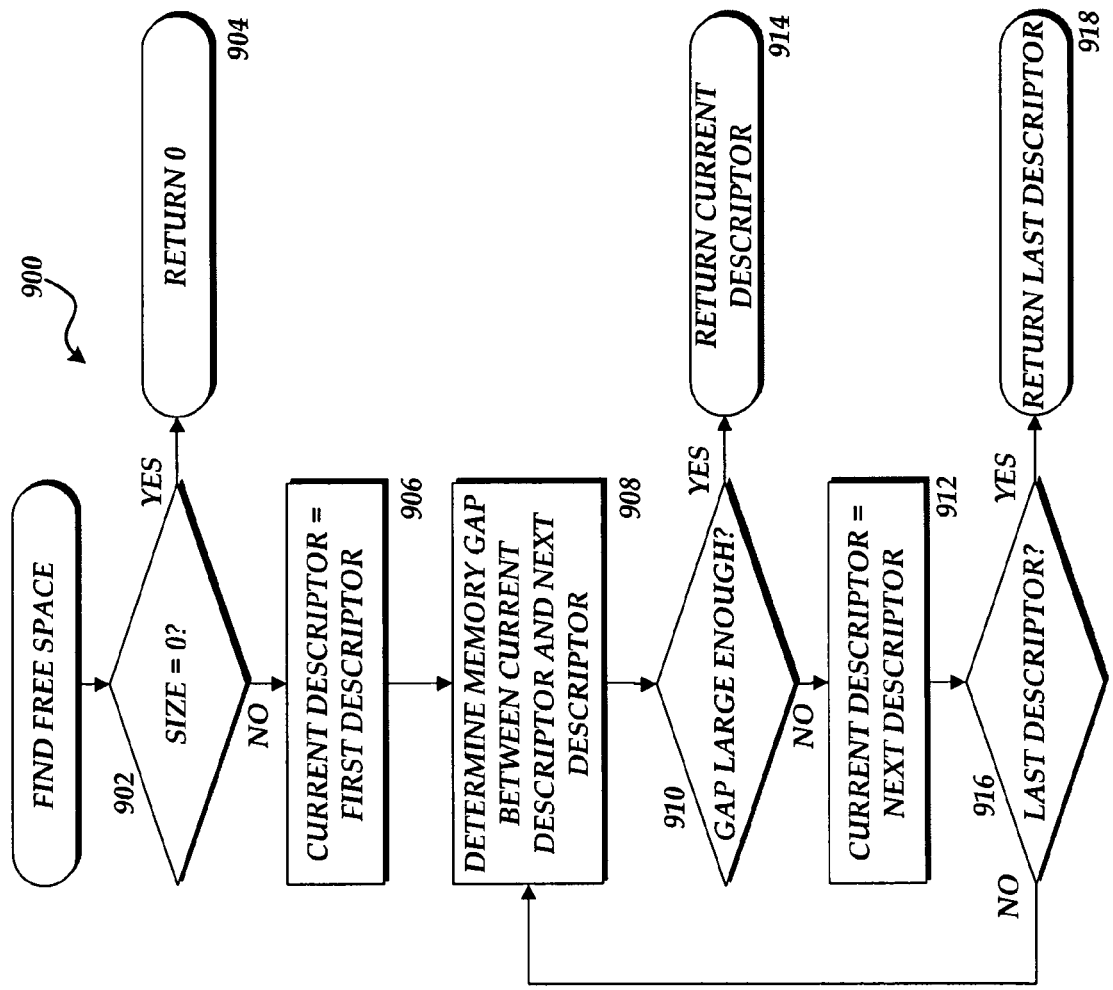

Turning now to FIG. 9, an illustrative routine 900 will be described for locating free memory space to be used to satisfy a request to allocate SMRAM. The routine 900 begins at operation 902, where a determination is made as to whether requested size of memory to be allocated is equal to zero. If the requested size is equal to zero, the routine 900 branches to operation 904, where an error is returned. If the size is greater than zero, the routine 900 continues to operation 906.

At operation 906, the variable corresponding to the current descriptor is set equal to the first descriptor within the current memory reserved table. The routine 900 then continues to operation 908 where the memory gap between the current descriptor and the next descriptor in the memory reserved table is determined. The routine 900 then continues to operation 910, where a determination is made as to whether the memory gap is large enough to satisfy the current request to allocate memory within the system management random access memory. If the gap between the current descriptor and the next descriptor is large enough to satisfy the request, the routine 900 branches to operation 914, where the current descriptor is returned. If the gap between the memory region identified by the current descriptor and the memory region identified by the next descriptor is not large enough to satisfy the current request to allocate memory, the routine 900 continues to operation 912.

At operation 912, the variable corresponding to the current descriptor is set to the next descriptor. The routine 900 then continues to operation 916 where a determination is made as to whether the last descriptor has been encountered. If the last descriptor has not been encountered, the routine 900 returns to operation 908. If the last descriptor has been encountered, the routine 900 branches from operation 916 to operation 918 where the last descriptor is returned. By returning the last descriptor, an indication is made that the memory to be allocated should be allocated at an address beyond the highest address allocated within the SMRAM.

Figure 10:
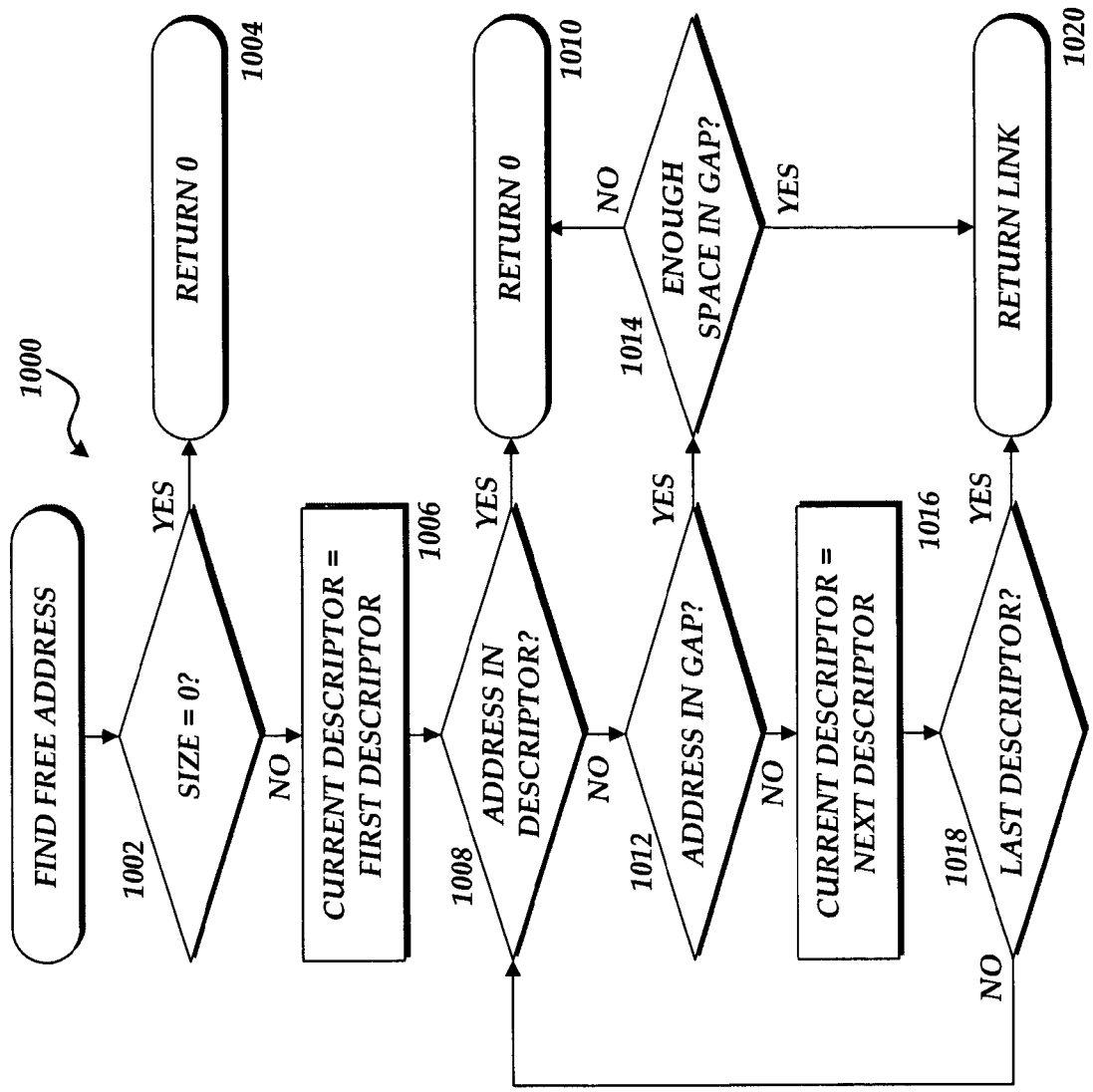

Turning now to FIG. 10, an illustrative routine 1000 will be determined for locating a memory region to satisfy the current request to allocate memory based on a requested memory address. The routine 1000 begins at operation 1002, where a determination is made as to whether the size of requested memory is equal to zero. If the size is equal to zero, the routine 1000 branches to operation 1004 where an error is returned. If the size is greater than zero, the routine 1000 continues to operation 1006 where a variable corresponding the current descriptor is set to the first descriptor in the current memory reserved table.

From operation 1006, the routine continues to operation 1008 where a determination is made as to whether the requested memory starting memory address for the new memory region is located within the memory region allocated by the current descriptor. If the address is located within the memory region defined by the current descriptor, the routine 1000 branches to operation 1010 where an error message is returned. If the requested address is not within the memory region defined by the current descriptor, the routine 1000 continues to operation 1012. At operation 1012, a determination is made as to whether the requested address is located within a memory gap defined by a noncontiguous memory region between the current descriptor and the next descriptor. If the requested address is in the memory gap, the routine 1000 branches to operation 1014. At operation 1014, a determination is made as to whether a sufficient amount of memory exists within the memory gap to satisfy the new request. If the gap is not large enough to satisfy the new request, the routine branches from operation 1014 to operation 1010 where an error message is returned. If enough space exists in the gap to satisfy the new memory request, the routine 1000 continues to operation 1020, where a link is returned to the memory address to be allocated.

If, at operation 1012, it is determined that the requested address is not within a memory gap between memory regions defined by two adjacent descriptors, the routine 1000 continues to operation 1016. At operation 1016, the variable corresponding to current descriptor is set to the next descriptor. The routine 1000 then continues to operation 1018, where a determination is made as to whether the last descriptor has been encountered. If the last descriptor has not been encountered, the routine 1000 branches back to operation 1008. If the last descriptor has been encountered, the routine branches to operation 1020, where a link is also returned to the memory address requested for the starting point of the currently requested memory allocation. It should be appreciated that the last descriptor represents the highest memory location already allocated.

Figure 11:
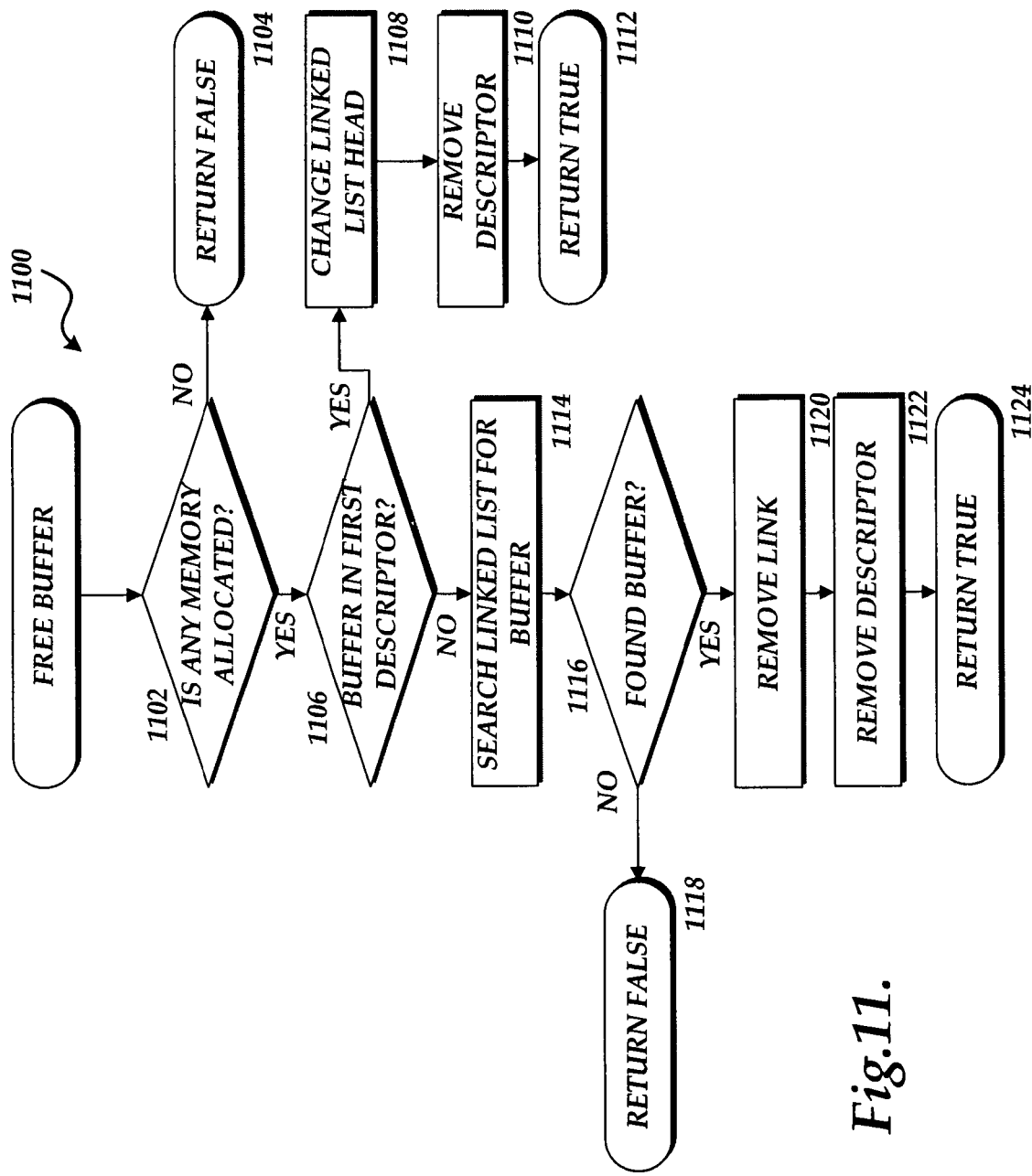
Figure 12A:
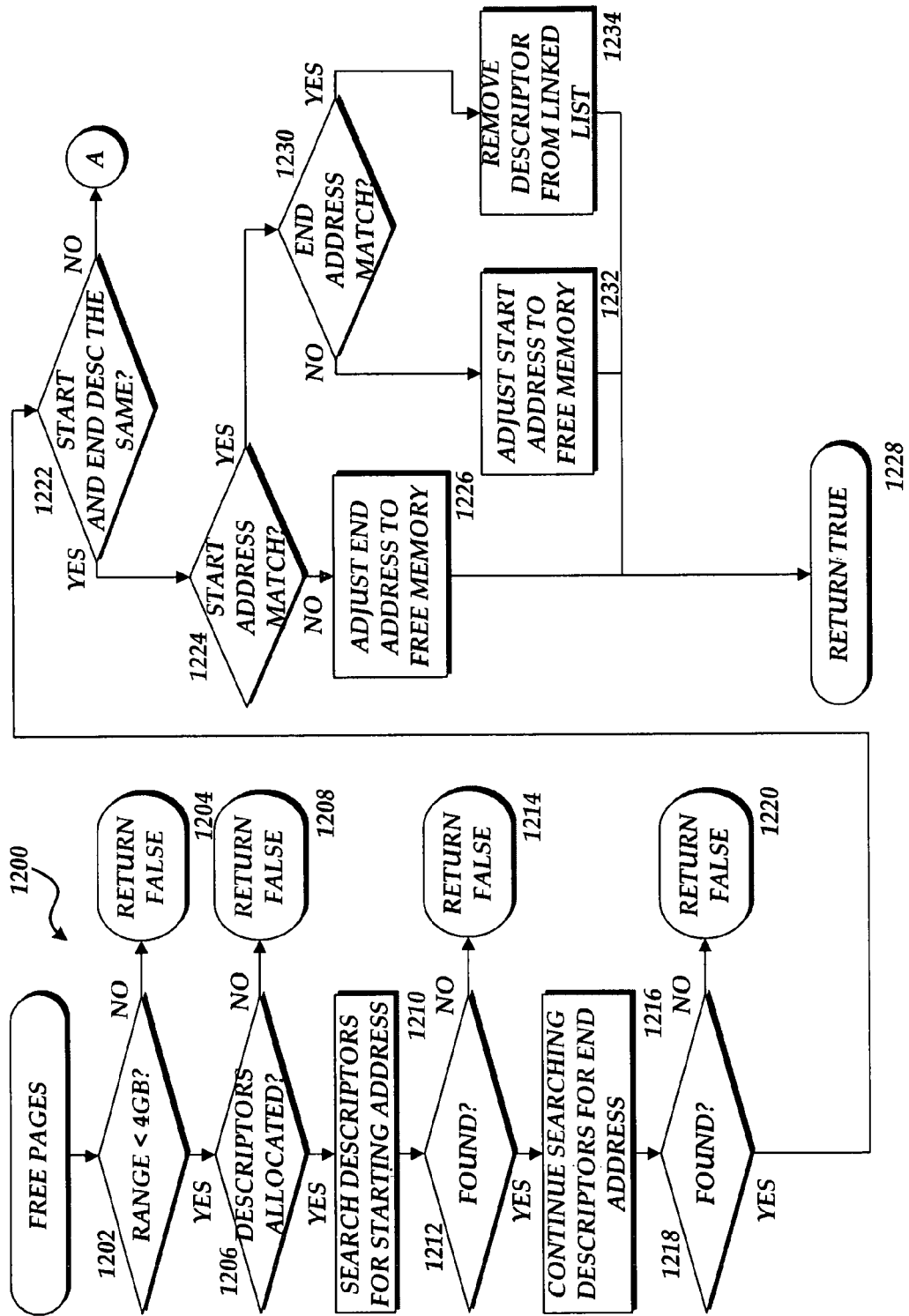
Figure 12B:
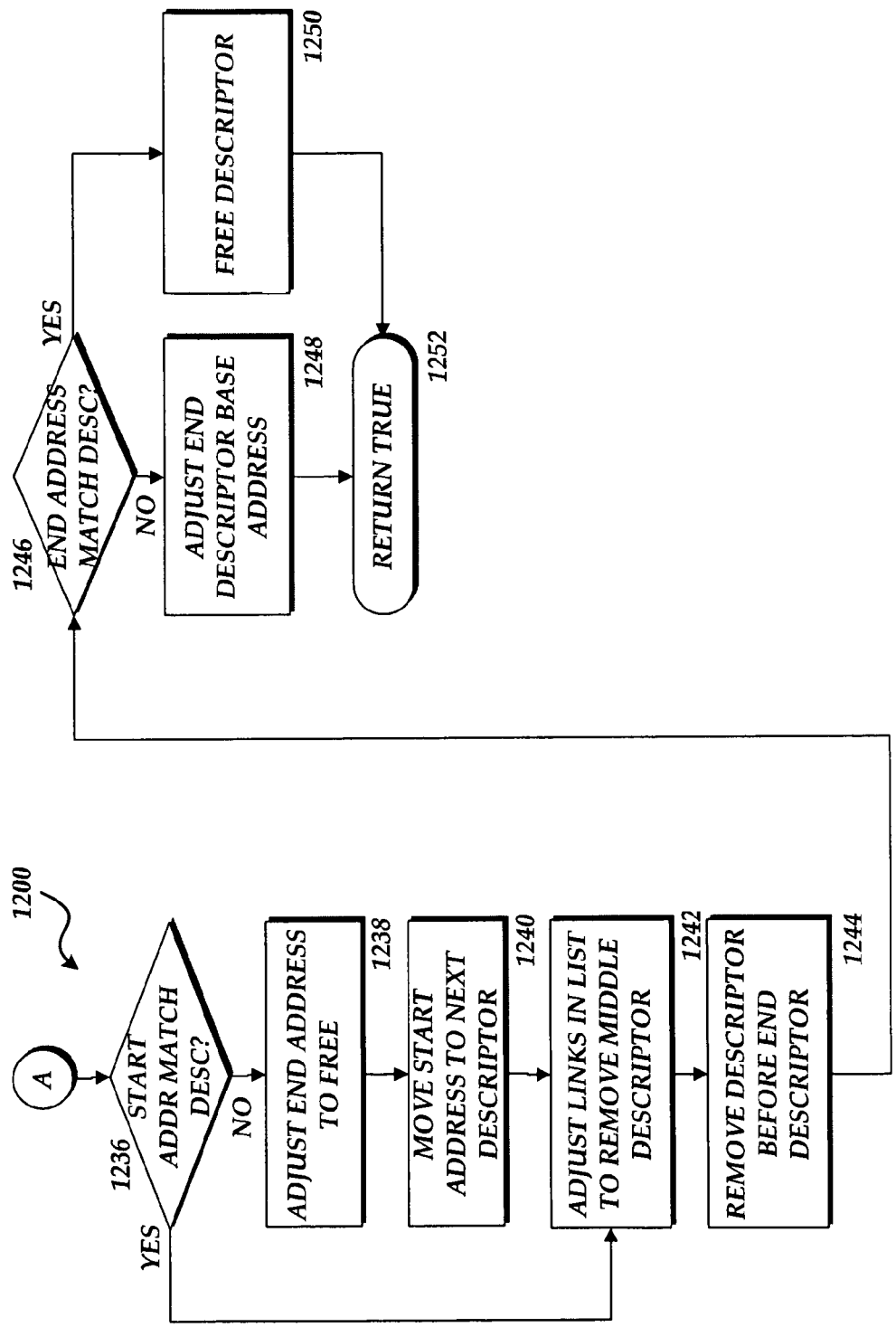

Turning now to FIG. 11, an illustrative routine 1100 will be described for freeing a region of previously allocated memory. This allocated memory may be defined by its starting address. Accordingly, the routine 1100 may take as a parameter the starting address of the buffer, or memory region, to be freed.

The routine 1100 begins at operation 1102, where a determination is made as to whether any memory has been allocated. If no memory has been allocated, the routine 1100 branches to operation 1104 where an error message is returned. If memory has been allocated, the routine 1100 continues to operation 1106, where a determination is made as to whether the identified buffer is located in the first descriptor in the memory reserved table. If the identified buffer is located within the first descriptor, the routine branches to operation 1108, where the pointer to the head 70 of the linked list is modified to point to the second descriptor in the memory reserved table. The first descriptor is then removed at operation 1110. An indication that the memory buffer was successfully removed is then returned at operation 1112.

If, at operation 1106, it is determined that the identified buffer is not located in the first descriptor, the routine 1100 continues to operation 1114. At operation 1114, the entire memory reserved table is searched for the identified buffer. The routine 1100 then continues to operation 1116, where a determination is made as to whether the buffer was found. If the identified buffer was not found, the routine 1100 branches to operation 1118, where an error message is returned to the requesting program. If the buffer was located, the routine 1100 continues to operation 1120, where the link to the descriptor is removed. The routine then continues to operation 1122, where the descriptor is removed in the manner described above with reference to FIG. 8. The routine 1100 then continues to operation 1124 where a message is returned indicating that the buffer was successfully removed.

According to embodiments of invention, a subset of an entire allocated memory region may be freed. The routine 1200 illustrates a routine for deallocating any number of pages of memory in this manner. It should be appreciated that a page of memory represents a fixed-size block of memory aligned to the fixed-size boundary. Accordingly, the routine 1200 receives as a parameter the starting address of the pages to be deallocated and the number of pages that should be deallocated.

The routine 1200 begins at operation 1202, where a determination is made as to whether the requested memory to be deallocated falls outside of a four gigabyte range. If the request is not within the four gigabyte range, the routine 1200 branches to operation 1204 where an error is returned. If the operation is within the four gigabyte range, the routine 1200 continues to operation 1206, where a determination is made as to whether any descriptors have been allocated. If no descriptors have been allocated, the routine 1200 branches to operation 1208 where an error is returned. If descriptors have been allocated, the routine 1200 continues to operation 1210, where the descriptors are searched for the starting address identified with the request to free a number of memory pages.

At operation 1212, a determination is made as to whether the starting address of the number of pages to be freed has been located. If it was not located, the routine 1200 branches to operation 1214, where an error message is returned. If the starting address was located, the routine 1200 continues to operation 1216, where the descriptors are searched for the ending address. The ending address is computed as the starting address of the region to be freed plus the number of pages that should be freed by the operation. From operation 1216, the routine 1200 continues to operation 1218, where a determination is made as to whether the end address was located within one of the descriptors. If the end address was not located within one of the descriptors, the routine 1200 branches to operation 1220, where an error message is returned. If the end address was located within one of the descriptors, the routine 1200 continues to operation 1222.

At operation 1222, a determination is made as to whether the descriptors containing the starting address and the ending address are the same descriptor. If the descriptors are not the same, the routine 1200 branches to operation 1236. If the descriptors are the same, the routine 1200 branches to operation 1224 where a determination is made as to whether the starting address of the region to be freed matches the starting address of the descriptor. If the starting address does not match, the routine 1200 continues to operation 1226, where the ending address of the current descriptor is adjusted to free the appropriate number of memory pages. The routine 1200 then continues to operation 1228, where an indication is returned that the deallocation of the requested number of memory pages was successful.

If, at operation 1224, a determination is made that the starting address of the region to be deallocated does match the starting address of the current descriptor, the routine 1200 branches to operation 1230. At operation 1230 a determination is made as to whether the end of the end address of the memory region to be deallocated corresponds to the end address of the memory region identified by the descriptor. If the ending addresses do not match, the routine 1230 branches to operation 1232, where the starting address is adjusted to free the requested memory. If the starting and ending addresses match, the routine 1200 branches to operation 1234 where the descriptor is removed from the linked list. From operations 1232 and 1234, the routine 1200 continues to operation 1228 where an indication is returned that the requested memory pages were successfully deallocated.

At operation 1236, a determination is made as to whether the starting address of the memory region to be deallocated matches the starting address of the first descriptor. If the starting address matches, the routine 1200 branches to operation 1242. If the starting addresses do not match, the routine 1200 continues to operation 1238 where the ending address of the current descriptor is adjusted to free the requested memory region. Reducing the end address is deallocating the higher memory addresses reserved by the descriptor. The routine 1200 then continues to operation 1240, where the starting address is moved to the next descriptor. The routine 1200 then continues to operation 1242, where the links are adjusted within the memory allocated table to remove any intermediate descriptors. The routine then continues to operation 1244, where the descriptor before the end descriptor is removed.

From operation 1244, the routine 1200 continues to operation 1246, where a determination is made as to whether the ending address of the memory region to be deallocated matches the ending address of the current descriptor. If the ending addresses match, the routine 1200 branches to operation 1250, where the descriptor is freed in the manner described above. If the ending address do not match, the routine 1200 continues to operation 1248, where the base address of the ending descriptor is adjusted. From operations 1248 and 1250, the routine 1200 continues to operation 1252 where an indication is returned to the calling program, indicating that the requested memory pages have been deallocated.

It will be appreciated that embodiments of the present invention provide methods, systems, apparatuses, and computer-readable media for providing memory management services in conjunction with EFI in a SMM computing mode. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for managing a system management random-access memory ("SMRAM") within a system management mode ("SMM") of a microprocessor, the method comprising:

creating a first memory reserved table in the SMRAM, the first memory reserved table comprising a predetermined number of descriptors and a number of used descriptors counter, wherein each of the predetermined number of descriptors is configured to represent an allocated region of SMRAM;

initializing the predetermined number of descriptors in the first memory reserved table to default values indicating an unused state;

receiving a request from a program executing within the SMM to allocate a requested region of SMRAM;

locating a first descriptor having the unused state from the predetermined number of descriptors in the first memory reserved table;

transforming the first descriptor to refer to the requested region of SMRAM indicating a used state and incrementing the number of used descriptors counter, wherein each of the predetermined number of descriptors having the used state are maintained in a singly linked list;

determining whether all of the predetermined number of descriptors in the first memory reserved table indicate the used state;

upon determining that all of the predetermined number of descriptors in the first memory reserved table indicate the used state, creating a second memory reserved table in the SMRAM; and initializing the predetermined number of descriptors in the second memory reserved table to default values indicating the unused state.

2. The computer-implemented method of claim 1, wherein each of the predetermined number of descriptors comprises an indication of a base memory location of the region of allocated SMRAM and an ending memory location of the region of allocated SMRAM.

3. The computer-implemented method of claim 2, wherein transforming the first descriptor to refer to the requested region of SMRAM comprises modifying the indication of the base memory location of the first descriptor to indicate the base memory location of the requested region of SMRAM and modifying the indication of the ending memory location of the first descriptor to indicate the ending memory location of the requested region of SMRAM.

4. The computer-implemented method of claim 2, wherein each of the predetermined number of descriptors further comprises a pointer to a next used descriptor in the singly linked list.

5. The computer-implemented method of claim 1, wherein the request to allocate a requested region of SMRAM comprises a request for a specific size of the requested region of SMRAM.

6. The computer-implemented method of claim 5, wherein the request to allocate a requested region of SMRAM further comprises a request for a specific address of the requested region of SMRAM.

7. The computer-implemented method of claim 1, further comprising:
receiving a request to deallocate a region of SMRAM;
identifying one or more of the predetermined number of descriptors corresponding to the region of SMRAM to be deallocated;
modifying the one or more of the predetermined number of descriptors to indicate the unused state; and
removing the one or more of the predetermined number of descriptors from the singly linked list.

8. A computer storage media having computer-executable instructions stored thereon that, when executed by a microprocessor in a system management mode ("SMM"), cause the microprocessor to:
create a first memory reserved table in a system management random-access memory ("SMRAM"), the first memory reserved table comprising a predetermined number of descriptors and a number of used descriptors counter, wherein each of the predetermined number of descriptors is configured to represent an allocated region of SMRAM;

initialize the predetermined number of descriptors in the first memory reserved table to default values indicating an unused state;

receive a request from a program executing within the SMM to allocate a requested region of SMRAM;

locate a first descriptor having the unused state from the predetermined number of descriptors in the first memory reserved table;

transform the first descriptor to refer to the requested region of SMRAM indicating a used state and increment the number of used descriptors counter, wherein each of the predetermined number of descriptors having the used state are maintained in a singly linked list;

determine whether all of the predetermined number of descriptors in the first memory reserved table indicate the used state;

upon determining that all of the predetermined number of descriptors in the first memory reserved table indicate the used state, create a second memory reserved table in the SMRAM; and initialize the predetermined number of descriptors in the second memory reserved table to default values indicating the unused state.

9. The computer storage media of claim 8, wherein each of the predetermined number of descriptors comprises an indication of a base memory location of the region of allocated SMRAM and an ending memory location of the region of allocated SMRAM.

10. The computer storage media of claim 9, wherein transforming the first descriptor to refer to the requested region of SMRAM comprises modifying the indication of the base memory location of the first descriptor to indicate the base memory location of the requested region of SMRAM and modifying the indication of the ending memory location of the first descriptor to indicate the ending memory location of the requested region of SMRAM.

11. The computer storage media of claim 9, wherein each of the predetermined number of descriptors further comprises a pointer to a next used descriptor in the singly linked list.

12. The computer storage media of claim 8, having further computer-executable instructions stored thereon that, when executed by the microprocessor, cause the microprocessor to:
receive a request to deallocate a region of SMRAM;
identify one or more of the predetermined number of descriptors corresponding to the region of SMRAM to be deallocated;
modify the one or more of the predetermined number of descriptors to indicate the unused state; and
remove the one or more of the predetermined number of descriptors from the singly linked list.

13. A system for providing management of a system management random-access memory ("SMRAM") within a system management mode ("SMM") of a microprocessor comprising:
a microprocessor supporting the SMM;
a firmware stored in non-volatile memory operatively connected to the microprocessor; and
an SMM memory manager module contained in the firmware and configured to
create a first memory reserved table in the SMRAM, the first memory reserved table comprising a plurality of descriptors, each of the plurality of descriptors configured to represent an allocated region of SMRAM, initialize the plurality of descriptors in the first memory reserved table to default values indicating an unused state, receive a request from a program executing within the SMM to allocate a requested region of SMRAM, locate a first descriptor having the unused state from the plurality of descriptors in the first memory reserved table, transform the first descriptor to refer to the requested region of SMRAM indicating a used state, wherein each of the plurality of descriptors having the used state are maintained in a singly linked list, determine whether all of the plurality of descriptors in the first memory reserved table indicate the used state, upon determining that all of the plurality of descriptors in the first memory reserved table indicate the used state, create a second memory reserved table in the SMRAM, and initialize the plurality of descriptors in the second memory reserved table to default values indicating the unused state.

14. The system of claim 13, wherein each of the plurality of descriptors comprises an indication of a base memory location of the region of allocated SMRAM, an ending memory location of the region of allocated SMRAM, and a pointer to a next used descriptor in the singly linked list.

15. The system of claim 13, wherein the SMM memory manager module is further configured to:

receive a request to deallocate a region of SMRAM;

identify one or more of the plurality of descriptors corresponding to the region of SMRAM to be deallocated;

modify the one or more of the plurality of descriptors to indicate the unused state; and remove the one or more of the plurality of descriptors from the singly linked list.

16. The system of claim 13, wherein the SMM memory manager module complies with an Extensible Firmware Interface ("EFI") standard.

* * * * *